United States Patent
Streib

(10) Patent No.: US 6,295,490 B1
(45) Date of Patent: Sep. 25, 2001

(54) METHOD AND ARRANGEMENT FOR OPERATING AN ACTUATOR IN A VEHICLE

(75) Inventor: Martin Streib, Vaihingen (DE)

(73) Assignee: Robert Bosch, Stuttgart (DE)

( * ) Notice: Subject to any disclaimer, the term of this patent is extended or adjusted under 35 U.S.C. 154(b) by 0 days.

(21) Appl. No.: 09/662,125

(22) Filed: Sep. 14, 2000

(30) Foreign Application Priority Data

Sep. 14, 1999 (DE) .............................................. 199 43 960

(51) Int. Cl.[7] .................................................. B60G 17/00
(52) U.S. Cl. .................................. 701/29; 701/39; 701/43; 701/76
(58) Field of Search .................................. 701/29, 34, 36, 701/39, 37, 41, 70, 43, 76, 77, 78, 93, 97; 708/530

(56) References Cited

U.S. PATENT DOCUMENTS

| 5,119,300 | 6/1992 | Bartke et al. . |
| 5,170,769 | 12/1992 | Berger et al. . |
| 5,732,371 | * 3/1998 | Fujita ...................................... 701/39 |
| 6,049,746 | * 4/2000 | Southward et al. .................... 701/37 |
| 6,144,904 | * 11/2000 | Tseng ...................................... 701/29 |

FOREIGN PATENT DOCUMENTS

| 40-1135913 | * 5/1992 | (JP) ........................................ 701/37 |

* cited by examiner

Primary Examiner—Richard M. Camby
(74) Attorney, Agent, or Firm—Walter Ottesen

(57) ABSTRACT

A method and an arrangement for operating an actuator in a motor vehicle are proposed. A first and/or a second operating variable signal is determined and a fault check thereof is carried out. When a fault occurs, a first reaction is immediately initiated, which can represent, for example, a limiting of the adjusting speed and/or of the acceleration of the actuator. When the fault condition has been present for a longer time, a second reaction is initiated, which applies a substitute signal instead of the faulty one for control or which consists of a switching off of the actuator operation.

17 Claims, 2 Drawing Sheets

METHOD AND ARRANGEMENT FOR OPERATING AN ACTUATOR IN A VEHICLE

BACKGROUND OF THE INVENTION

Electronic control systems are increasingly utilized in vehicles. These control systems operate at least one actuator element of a vehicle on the basis of detected operating variables or on the basis of operating quantities derived from measured quantities. Such control systems are used to control the drive unit, the brake system or other functions. For example, in the context of so-called drive-by-wire systems or brake-by-wire systems, an actuator of the vehicle is driven or actuated on the basis of the detected driver command via an electronic control system. What is common to these control systems is that the detection of an operating quantity, which influences the basic function, is redundantly secured. Accordingly, in these systems, the position of the operator-controlled element (accelerator pedal, brake pedal), which is actuated by the driver, is detected by at least two measuring devices independently of each other. The same applies to systems (for the actual value detection) wherein the actuator is adjusted in the context of a control loop (for example, a positioning control) in accordance with a desired value derived from the driver command. The detection of the particular operating quantity is at least redundant and serves for fault detection, for example, in that the two detected measured quantities or the quantities derived therefrom are checked with respect to each other as to a pregiven tolerance range. A procedure of this kind is disclosed with respect to the example of a drive-by-wire system in U.S. Pat. No. 5,170,769.

In checks of this kind, an actual fault condition with subsequent emergency operation with a view to disturbance signals is only detected when the check has shown the result "implausible" over a specific time. The emergency function is therefore initiated relatively late. In this way, damage in the actuator can occur with this actuator being actuated as in normal operation notwithstanding a fault condition. This is primarily the case for the control of a throttle flap by means of an actuating motor where, for example, a dynamic driving to the mechanical stop with mechanical damage as the consequence can occur when, for example, there is a separation of the signal line.

U.S. Pat. No. 5,119,300 discloses sensors which output a base signal (for example, zero) in an operating state of a vehicle as well as in the case of a fault. With the occurrence of the base signal, a preliminary emergency function is initiated and thereafter a fault check is carried out. The emergency function, which is provided for the case of a fault, is only initiated when the fault condition has been determined.

SUMMARY OF THE INVENTION

It is an object of the invention to provide measures which shorten the reaction time in response to an implausibility situation without the availability of use of the control system being significantly affected for the case wherein no fault condition is present.

The method of the invention is for operating an actuator in a vehicle and includes the steps of: detecting a first operating quantity; actuating the actuator in dependence upon at least the first operating quantity; doing one of the following: detecting the first operating quantity redundantly or detecting a second operating quantity having a clear relationship to the first operating quantity; comparing the first operating quantity to the redundantly detected first operating quantity or to the second operating quantity in the context of a plausibility check; for implausibility, initiating a first fault reaction operation; and, for a continued presence of the implausibility, initiating a second fault reaction operation.

Another embodiment of the method of the invention for operating an actuator in a vehicle includes the steps of: detecting an operating quantity; actuating the actuator in dependence upon at least the operating quantity; detecting a fault condition from a plausibility check of the operating quantity; for implausibility, immediately initiating a first fault reaction operation wherein at least one of the velocity of the actuator and the acceleration of the actuator is limited; and, for a continued presence of the implausibility, initiating a second fault reaction operation wherein the actuation of the actuator is brought to standstill or a substitute operating quantity is applied to actuate the actuator.

A rapid reaction (first fault reaction operation) is initiated immediately after the occurrence of an implausibility in the area of the detection of operating quantities in that a first reaction to an implausibility between two operating quantity signals is initiated immediately after occurrence of the first implausibility with the operating quantity signals having a clear relationship to each other. In this way, a significant reduction of the availability of use of the control system is avoided because damaging effects of the implausibility are substantially avoided because of the first reaction without the availability of use being significantly limited. A second reaction defines an emergency operation of the control system. Because of this second reaction (second fault reaction operation), the system is lead into a safe condition after the elapse of a specific time with certain implausibility.

The application of this procedure is especially advantageous in so-called drive-by-wire systems wherein a power adjusting element is adjusted in dependence upon the driver command by means of a control loop. There, fault functions are recognized because of plausibility comparisons of the redundantly detected actual quantities and/or the redundantly detected desired quantity and a reaction takes place in correspondence to the above procedure. Because of the first reaction, the actuator is no longer driven dynamically to its mechanical end stops. This is done, for example, by limiting the adjusting speed of the actuator by limiting the current and/or the drive signal for the actuator. Mechanical damage is avoided. The second reaction to implausibility is then an emergency operation reaction via which the control is brought to standstill or driven further on the basis of substitute quantities.

Especially advantageous is the application to a position control wherein the desired value and the actual value represent the position of the power adjusting element. This takes place even when the actual value and/or the desired value is not redundantly detected and are instead checked by means of an operating quantity which has a clear relationship to the position (for example, the air mass). The two different quantities are converted to a common basis and the plausibility check is carried out on this basis.

Likewise advantageous is the application of the above procedure in brake-by-wire systems. Here too, at least the detection of the driver braking command takes place by means of at least a redundant determination of the degree of actuation of the brake pedal. Here too, a plausibility comparison of the signals is carried out for fault detection. In an advantageous manner, a first reaction is undertaken immediately after detecting the first implausibility. The first reaction is, for example, a brake control on the basis of the maximum value. After ensuring the fault detection, an emergency operation measure (for example, speed limiting) is initiated as the second reaction.

BRIEF DESCRIPTION OF THE DRAWINGS

The invention will now be described with reference to the drawings wherein.

DESCRIPTION OF THE PREFERRED EMBODIMENTS OF THE INVENTION

The procedure in accordance with the invention is described hereinafter with respect to a preferred embodiment of a drive-by-wire system wherein a power control element of a drive unit is actuated in the context of a position control. The power actuating element can be especially a throttle flap. The procedure of the invention is, however, not limited to this embodiment but is everywhere applicable where an actuator is driven on the basis of an operating quantity which is monitored via a plausibility check with a redundantly detected operating quantity or with an operating quantity which has a clear relationship to the first operating quantity. The monitoring can, for example, be in the context of a control loop for adjusting a power adjusting element, in brake-by-wire systems, et cetera.

Figure 1:
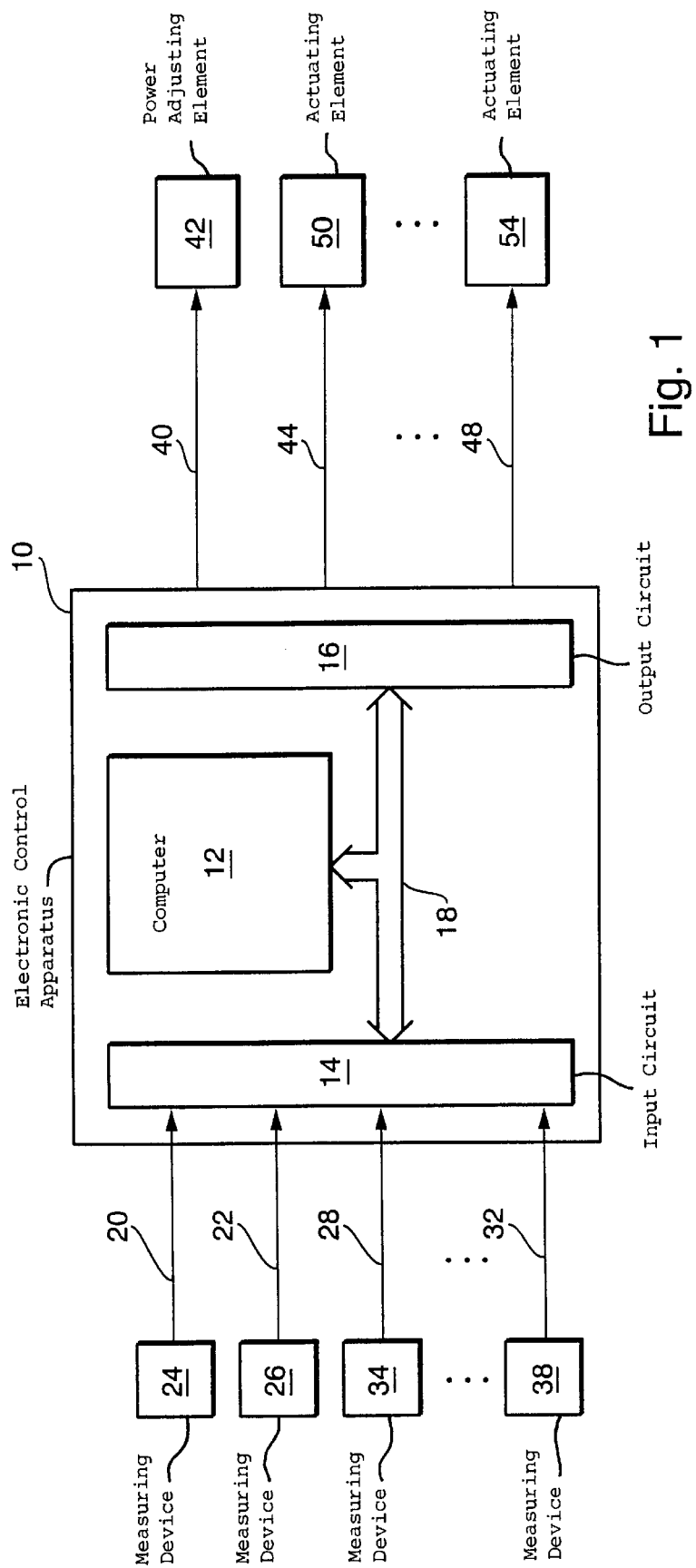
FIG. 1 is an overview block circuit diagram of a control arrangement for operating an actuator in a vehicle in accordance with a preferred embodiment of the invention; and, FIG. 2 is a flowchart wherein the above-described procedure is outlined as a computer program of the control arrangement.

FIG. 1 shows an electronic control apparatus 10 which includes at least one computer 12, an input circuit 14, an output circuit 16 and a communication system 18 connecting these elements. Input lines lead to the input circuit 14 and measurement signals from measuring devices are read in via these input lines. The measurement signals represent operating quantities or are derivable from operating quantities. In the preferred embodiment, input lines 20 to 22 are provided which connect the control apparatus 10 to measuring devices 24 and 26. The measuring devices detect the position of the power adjusting element (for example, a throttle flap) and, depending upon the embodiment, are potentiometers or contactless sensors. The measurement quantities U1 and U2 of the measuring devices are conducted via the respective lines 20 and 22 to the input circuit 14. Furthermore, and for reasons of clarity, the other input lines and measuring devices are taken together as reference numerals 28 to 32 and 34 to 38, respectively. The input lines are provided in connection with the control of a drive unit. Operating quantities such as accelerator pedal position, engine rpm, engine temperature, exhaust-gas composition, et cetera are detected by the measuring devices and corresponding measurement signals are conducted via the input lines to the input circuit 14.

Drive signals for actuating the power adjusting element 42 (for example, an electrically actuable throttle flap) are outputted via output circuit 16 and the output line 40. Furthermore, output lines 44 to 48 are shown via which additional actuating elements 50 to 54 are driven. These actuating elements are, for example, actuating elements for fuel injection, ignition angle setting, charge pressure adjustment:, et cetera.

In the preferred embodiment, the power actuating element 42 is adjusted in the context of a position control loop. A position controller of this kind is implemented in the computer 12. The position controller outputs an output signal in dependence upon a position desired value (formed at least on the basis of the accelerator pedal position) while considering the positioning actual value of the power adjusting element (one of the adjusting signals supplied via the lines 20 and 22) in accordance with a pregiven controller structure. The output signal actuates the actuator in the sense of bringing the actual value to approach the desired value. In the preferred embodiment, a pulsewidth modulated signal is outputted as a drive signal which leads to a mean current through the actuator motor of the power adjusting element 42. For fault detection, plausibility checks of the redundant positioning signals are carried out. The deviation between the two position signal values is checked as to a pregiven tolerance range. An implausibility is determined when the deviation is greater than the pregiven tolerance range.

If, for example, the signal line of a measuring device for the actual signal becomes separated, then it is possible that the position controller recognizes a power adjusting element which is apparently adjusted to large values because the deviation between the desired value and the actual value is large. The actuator is therefore actuated in the direction of smaller positioning values so that the actuator is finally pressed against a stop. Mechanical and electrical damage can be the consequence. Although the implausibility is detected, it is, however, only taken as a fault after several measurements and/or after the elapse of a specific time with an implausibility detection in order to avoid fault triggering based on short disturbances. This time can be 140 milliseconds in a preferred embodiment and within this time, a drive to the mechanical stop can already have taken place.

In order to improve this unwanted behavior, it is provided that a first fault reaction is initiated immediately after detection of an implausibility with reference to the above-mentioned measurement signals. In the preferred embodiment, this comprises at least that the position control does still operate but the current and/or the drive signal ratio is limited to a value at which the actuator only reaches a limited adjusting speed or acceleration. In this way, a drive to the stop with full impact is countered. If, after the elapse of a specific time (for example, 140 milliseconds) the implausibility continues to be detected, then there is a transition from the first fault reaction to a second fault reaction. In the preferred embodiment, this comprises a switchover of the actual value from the defective measuring device to the other measuring device (when the fault source is clearly recognizable) or (in other cases) an interruption of the flow of current to the actuator.

Generally, the procedure which is shown is not only carried out in combination with the illustrated embodiment and in combination with the actual value detection but in all those control systems wherein the control of an actuator takes place in dependence upon an operating quantity which is monitored by means of a redundant detection and/or by means of another operating variable having a clear relationship thereto. The configuration of the reactions to an implausibility also is applicable when the implausibility is detected with the aid of a signal-range check on an individual signal.

Figure 2:
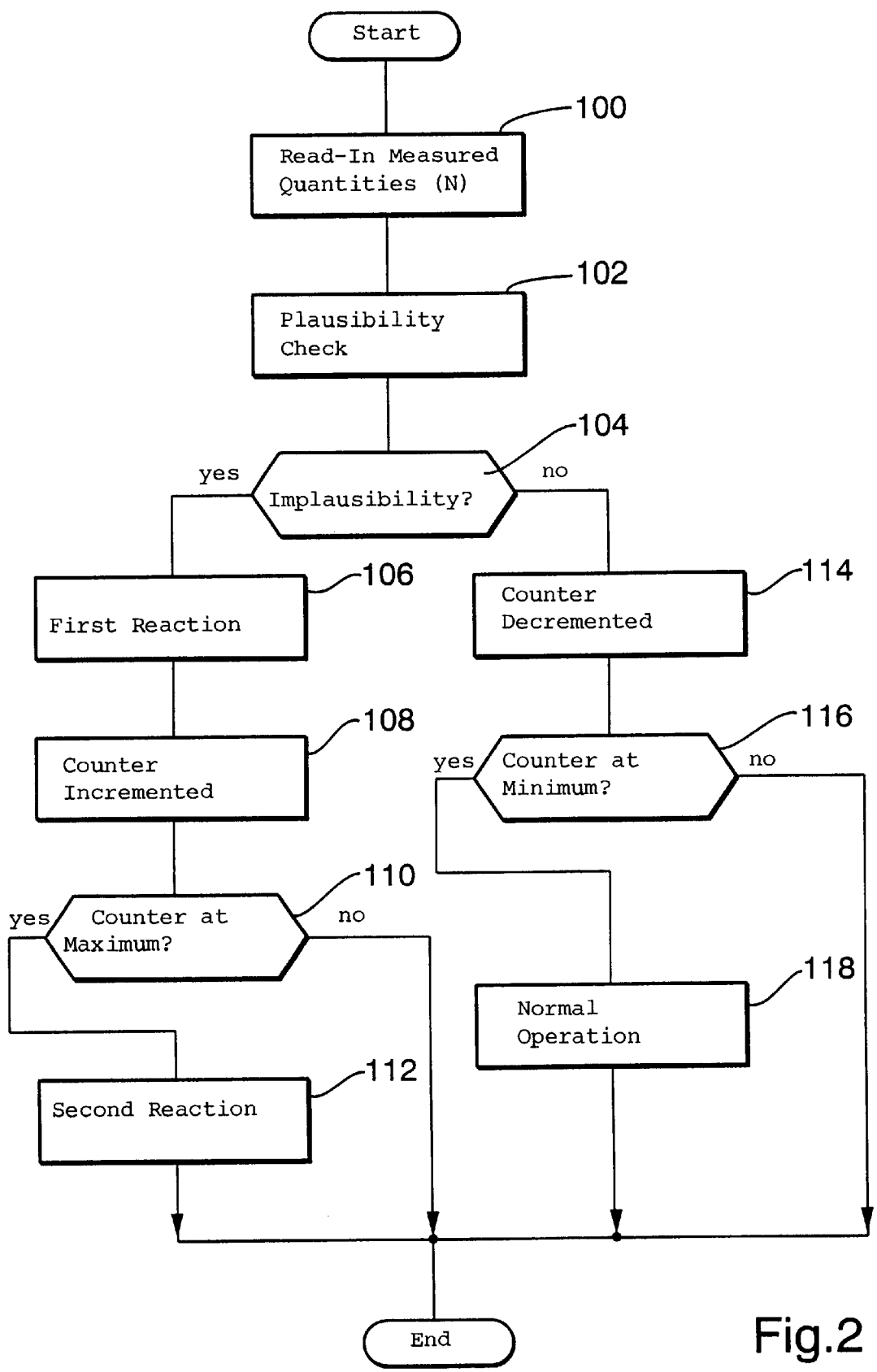

The realization of the above-described procedure in the preferred embodiment takes place by means of a computer program. An example for such a computer program is shown as a flowchart in FIG. 2.

The program is started at pregiven time points. In the first step 100, the measured quantity or the measured quantities are read in. Thereafter, in step 101, a plausibility check of the measured quantity or of the measured quantities is carried out. The plausibility check is carried out either with the aid of a comparison of the deviation of two quantities redundant to each other with a pregiven tolerance band or is carried out by a comparison of the time-dependent changes of two signals or is carried out with the aid of a signal-range check of individual measurement quantities. In the next step 104, a check is made as to whether the plausibility check has produced an implausibility, that is, whether the deviation between the two quantities exceeds the tolerance range or the time-dependent changes of the signals do not correlate with each other or whether the measured quantity has moved outside of its value range. If this is the case, then, in accordance with step 106, a first reaction is carried out, which, in the preferred embodiment, comprises limiting the adjusting speed and/or the acceleration of the actuator. Thereafter, in step 108, a counter, which is reset at the start of operation, is incremented. The count of the counter is then compared in step 110 to a maximum value and is limited thereto. If the maximum value is not reached, the program is ended and run through again at the next time point. The actuator is operated in the context of the first reaction.

If the maximum value of the counter is reached, that is, if the implausibility is present in step 101 for a specific time, then, in accordance with step 112, a second reaction is initiated which, depending upon the configuration, consists of a switchover of the actual value of the position controller and/or in an interruption of the flow of current to the actuator. After step 112, the program is ended and run through again at the next time point.

If, in step 104, an implausibility is not detected or the implausibility is no longer present, then, according to step 114, the counter is decremented. Thereupon, in step 116, a check is made to determine if the counter has reached its minimum value. If necessary, the counter is then limited to this minimum value. If this is not the case, then the program is ended and the actuator is operated in the context of the first or the second reaction (the currently active reaction) If the count is at its minimum value, then, according to step 118, the actuator is controlled in the context of the normal operation. After step 118, the program is ended and run through again at the next time point.

In one embodiment, the first fault reaction provides that the control signal (pulsewidth modulated signal or current through the electromotoric drive) of the actuator is set or limited to a pregiven value independently from the first or second operating variable. This pregiven, value prevents fast movements of the actuator and, in the ideal case, leads to a standstill of the actuator in its then present position.

If the reaction consists of a switchover to a substitute signal, then the switchover is reversible or irreversible in dependence upon the configuration.

When initiating the second fault reaction operation, the first one is withdrawn.

It is understood that the foregoing description is that of the preferred embodiments of the invention and that various changes and modifications may be made thereto without departing from the spirit and scope of the invention as defined in the appended claims.

What is claimed is:

1. A method for operating an actuator in a vehicle, the method comprising the steps of:
   detecting a first operating quantity;
   actuating said actuator in dependence upon at least said first operating quantity;
   doing one of the following: detecting said first operating quantity redundantly or detecting a second operating quantity having a clear relationship to said first: operating quantity;
   comparing said first operating quantity to the redundantly detected first operating quantity or to said second operating quantity in the context of a plausibility check;
   for implausibility, initiating a first fault reaction operation; and,
   for a continued presence of said implausibility, initiating a second fault reaction operation.

2. The method of claim 1, wherein said first operating quantity is the position of said actuator and said second operating quantity is an operating quantity having a direct relationship to said position.

3. The method of claim 1, wherein said actuator is driven with a drive signal; said first fault reaction comprises adjusting said drive signal to a value or limiting said drive signal to a value independently of said first or second operating quantity which value hinders a rapid movement of said actuator and leads to holding said actuator in its current position.

4. The method of claim 1, wherein said first reaction is withdrawn when said second reaction is initiated.

5. The method of claim 1, wherein an implausibility is recognized when there is an impermissible deviation of said first: and second operating quantities or when the time-dependent change of said first and second quantities do not correlate with each other.

6. The method of claim 1, wherein said actuator is actuated in the context of a control loop; and, wherein said first operating quantity is at least one of the desired value of said control loop and/or the actual value of said control loop.

7. The method of claim 6, wherein said control loop is a position control loop and said first operating quantity is at least one of the position of a power adjusting element and a position of an operator-actuated element.

8. A method for operating an actuator in a vehicle, the method comprising the steps of:
   detecting an operating quantity;
   actuating said actuator in dependence upon at least said operating quantity;
   detecting a fault condition from a plausibility check of said operating quantity;
   for implausibility, immediately initiating a first fault reaction operation wherein at least one of the velocity of said actuator and the acceleration of said actuator is limited; and, for a continued presence of said implausibility, initiating a second fault reaction operation wherein the actuation of said actuator is brought to standstill or a substitute operating quantity is applied to actuate said actuator.

9. The method of claim 8, wherein said operating quantity is a first operating quantity and is the position of said actuator; obtaining a said second operating quantity having a direct relationship to said position; and, said plausibility check is made by comparing said first and second operating quantities.

10. The method of claim 8, wherein said actuator is driven with a drive signal; said first fault reaction comprises adjusting said drive signal to a value or limiting said drive signal to a value independently of said operating quantity which value hinders a rapid movement of said actuator and leads to holding said actuator in its current position.

11. The method of claim 8, wherein a switchover to said substitute operating quantity is reversible or irreversible.

12. The method of claim 8, wherein said first reaction is withdrawn when said second reaction is initiated.

13. The method of claim 9, wherein an implausibility is recognized when there is an impermissible deviation of said first and second operating quantities or when the time-dependent change of said first and second quantities do not correlate with each other.

14. The method of claim 8, wherein said actuator is actuated in the context of a control loop and wherein said operating quantity is at least one of the desired value of said control loop and/or the actual value of said control loop.

15. The method of claim 14, wherein said control loop is a position control loop and said operating quantity is at least one of the position of a power adjusting element and a position of an operator-actuated element.

16. An arrangement for operating an actuator in a vehicle, the arrangement comprising:
    a first measuring device for supplying a first signal representing a first operating quantity;
    a second measuring device for supplying a second signal representing a second operating quantity having a clear relationship to said first operating quantity and vice versa;
    an electronic control apparatus connected to said first and second measuring devices for receiving said first and second signals; and,
    said electronic control apparatus including a computer containing a program functioning to do the following:
    (a) form a drive signal for said actuator in dependence upon at least one of said first and second signals;
    (b) compare said first and second signals to each other in the context of a plausibility check for detecting a fault;
    (c) for implausibility, immediately initiate a first fault reaction operation; and,
    (d) for a continued presence of said implausibility, initiate a second fault reaction.

17. An arrangement for operating an actuator in a vehicle, the arrangement comprising:
    a measuring device for supplying a first signal representing an operating quantity;
    an electronic control apparatus connected to said measuring device for receiving said first signal;
    said electronic control apparatus including a computer containing a program functioning to do the following:
    (a) form a drive signal in dependence upon said signal representing said operating quantity;
    (b) check said first signal as to plausibility;
    (c) when recognizing implausibility, immediately initiating a first fault reaction operation wherein at least one of the velocity of said actuator and said acceleration of said actuator is limited; and,
    (d) for a continued presence of said implausibility, initiating a second fault reaction operation wherein the actuation of said actuator is brought to standstill or a substitute operating quantity is applied to actuate said actuator.

\* \* \* \* \*

UNITED STATES PATENT AND TRADEMARK OFFICE
CERTIFICATE OF CORRECTION

PATENT NO.    : 6,295,490 B1
DATED         : September 25, 2001
INVENTOR(S)   : Martin Streib Page 1 of 1

It is certified that error appears in the above-identified patent and that said Letters Patent is hereby corrected as shown below:

Column 6,
Lines 1 and 25, delete "first:" and substitute -- first -- therefor.
Line 47, after "and," start a new paragraph.

Signed and Sealed this

Ninth Day of April, 2002

Attest:

JAMES E. ROGAN
*Attesting Officer*    *Director of the United States Patent and Trademark Office*